Oct. 3, 1933.  J. F. BERGANDER  1,928,876
ANTITHEFT DEVICE
Filed July 27, 1931

Inventor
John F. Bergander
By Langan Moon
Atty.

Patented Oct. 3, 1933

1,928,876

UNITED STATES PATENT OFFICE 1,928,876

ANTITHEFT DEVICE

John F. Bergander, Chicago, Ill.

Application July 27, 1931. Serial No. 553,351

3 Claims. (Cl. 40—125)

This invention relates to anti-theft devices and is of particular utility in connection with license plate fasteners for automobiles.

Among other objects, the invention aims to provide an improved fastener which is both ornamental and irremovable except by destruction of a portion of the fastener.

The invention may be understood by reference to the illustrative construction shown in the accompanying drawing, in which—

Figure 1:
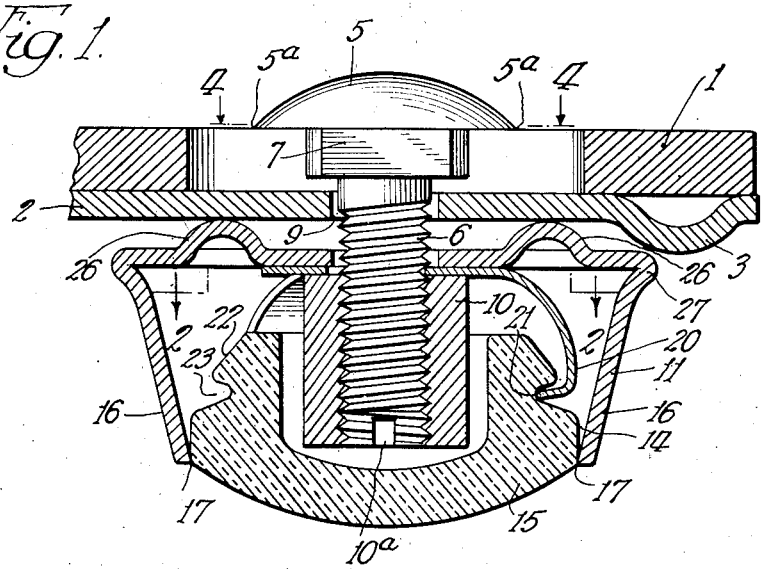
Figure 1 is a fragmentary cross section of a mounting with the device applied thereto, the device being shown in axial section.
Figure 2:
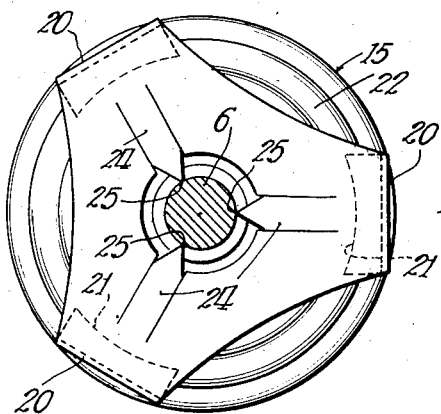
Figure 2 is a section on the line 2—2 of Figure 1.
Figure 3:
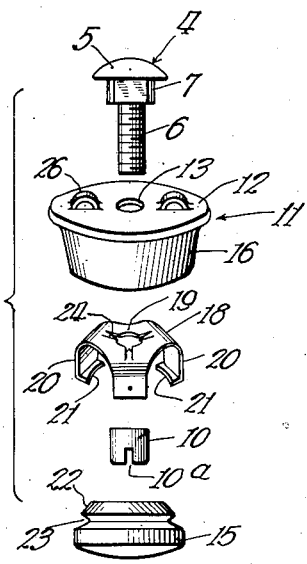
Figure 3 is a perspective view of the parts on a reduced scale in separated relation.
Figure 4:
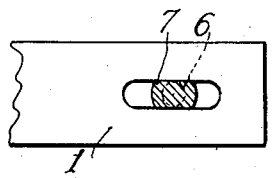
Figure 4 is a sectional view on a reduced scale taken on the line 4—4 of Figure 1, parts being omitted.

Referring in detail to the drawing, the mounting 1 may be a bracket attached to an automobile for mounting an object such as the license plate 2. The license plate usually has a marginal bead as at 3.

My invention includes a bolt 4 which has a head 5 and a shank 6, the latter passing through the mounting 1. Interengaging means between the bolt and the mounting to prevent rotation of the bolt in the mounting is provided in this instance by a transversely elongated portion 7 of the bolt between the head and the shank which engages the sides of an elongated opening 8 in the mounting 1, the shank 6 passing freely through the opening 8. The elongation of the opening 8 also permits of adjustment of the bolt in selected positions on the mounting.

The head 5 of the bolt is desirably of dome-like formation having edges 5a which terminate substantially flush with the surface of the mounting 1. So constructed and arranged the head of the bolt affords no purchase for a turning or prying tool.

As here shown, the shank 6 after passing through the elongated opening in the mounting 1 may be passed through a circular opening 9 in the license plate 2 to mount the license plate upon the mounting or bracket 1, after which a retaining member is placed upon the shank 6 and the retaining member sealed against access.

Such retaining member is represented by the nut 10 which has threaded engagement with the shank 6 and the sealing means desirably includes a housing for the nut having a glass closure.

In this instance, the nut 10 is of cylindrical formation and is provided with a kerf 10a in its outer end permitting it to be turned by a screw driver for convenience.

In the illustrative construction, the housing 11 is in the form of a circular metal cup having a closed end 12 in which there is centrally disposed aperture 13 and having an open end 14, the bolt shank 6 being passed through the opening 13 in the closed end 12 in the direction of the open end 14, the closed end 12 being between the nut 10 and the license plate 2 and the margins of the opening 13 being pressed upon by the nut 10 to retain the housing in position.

The housing 11 thus encloses the nut 10 and the contiguous portion of the shank 6 and the open end 14 of the housing is closed by a relatively heavy circular cap 15 which is desirably of glass, for example, which may be ornamentally colored and polished and while being difficult to break by unauthorized persons, may be broken under proper circumstances to remove the license plate for replacement. The housing 11 is desirably constructed with the conoidal side 16 and the cap 15 desirably has edges 17 which are substantially flush with the edges of the sides 16, in this instance, the cap 15 being shown with a spheroidal outer surface. This spheroidal outer surface for the cap and its flush edges in cooperation with the conoidal side of the housing affords no purchase for a tool which might be used by an unauthorized person to remove the cap, and the conoidal formation of the housing affords no purchase for a tool which might be used in an attempt to remove the housing. The spheroidal outer surface of the cap and the conoidal sides of the housing furthermore present an attractive appearance which, when the cap is of colored glass as suggested, simulates the appearance of a jewel in its setting.

The cap 15 may be irremovably secured to the housing 11 by means here shown including a lock washer 18 received in the housing 11 and which has a centrally disposed opening 19 through which the bolt shank passes, the margins of the opening 19 being clamped between the nut 10 and the housing 11, thus securing the washer within the housing.

I have shown interengaging means between the lock washer 18 and the cap 15 for locking the cap to the housing 11. As here shown, the washer 18 is also of cup-like formation, the arm-like sides 20 of which terminate in the inwardly directed spring fingers 21 of which there are desirably at least three. The cap 15, at its inner end is desirably frusto-conical and has the annular cam surface 22 and when the cap is pushed into position to close the housing the spring fingers 21 ride upon the cam surface 22 by which they are spread apart to spring into the peripheral annular groove 23 at the base of the cam surface 22. Thus the cap can be moved only in a direction to close the housing and is irremovable except by breaking the cap and picking out the pieces. The cap 15 is desirably axially recessed as shown in the drawing to receive the nut 10 and the frusto-conical end of the cap is thus received between the nut 10 and the spring fingers 21.

To prevent rotation of the washer 18, I show it provided with inwardly directed tongues 24 which are struck out from the body of the washer margining the opening 19 and which have the prong-like terminations 25. When the washer is placed upon the bolt 4 the tongues 24 can be flexed to permit the bolt to be freely passed through the opening 19, but when the washer is clamped between the housing 11 and the nut 10, as already described, the tongues 24 are pressed into the plane of the margin of the opening 19 and the prong-like terminations 25 are sufficiently long to project into the opening 19 and bite into the bolt 4.

Thus if the housing 11 be turned, for example, in a direction tending to unscrew the nut 10, the washer 18 gripping the shank 6 will resist rotation and will prevent the rotation of the housing from being transmitted to the nut, so that the housing will merely turn idly.

To prevent interference between the housing 11 and the bead 3 on the license plate, when the housing is located for example relatively close to the bead, I have shown the knobs 26 on the closed end 12 of the housing, the knobs in this case being merely struck out from the closed end 12 and the housing pressing upon the license plate through the intermediation of the knobs which thus raise the margin 27 of the housing to clear the bead 3.

Obviously, the invention is not limited to the details of construction herein shown for purposes of illustration. Such changes may be made as fall within the scope of the following claims without departing from the invention.

Having described an embodiment of my invention, I claim:

1. As an article of manufacture, a license plate fastener including a bolt having a head and a threaded shank, said head being of dome-like formation and the bolt having a transversely elongated portion between the head and the shank adapted to pass through an elongated aperture in a license plate mounting; a cup-shaped circular housing closed at one end and open at the other, said closed end having a centrally disposed opening through which the shank is passed toward said open end; a nut on the shank received in the housing; a lock washer having a centrally disposed opening through which the shank is passed, the margins of the opening being received between the nut and the housing, said washer having prongs margining said opening and adapted to grip the shank upon pressure of the nut and having a plurality of free spring fingers within the housing; and a cap closing the open end of the housing and having locking engagement with the spring fingers of the washer, said cap having a spheroidal outer surface and having edges substantially flush with the housing.

2. In a structure of the class described, the combination with a mounting; of a license plate, said license plate having a marginal bead thereon; a bolt having a dome-like head on one side of the mounting and a threaded shank passing through the mounting and the license plate, said head having edges which terminate substantially flush with the mounting; a nut on the shank; a cup-shaped housing surrounding the nut and pressed by the nut against the license plate to clamp the license plate against the mounting, said housing having knobs thereon through the intermediation of which the housing presses the license plate, said knobs causing the body of the housing to clear the marginal bead on the license plate; a washer enclosed within the housing and locked thereto by the nut; spring fingers on the washer; and a cap covering the nut and forming a closure for the housing, said fingers irremovably engaging said cap and being concealed by said cap and housing.

3. As an article of manufacture, an anti-theft device of the class described including a bolt having a threaded shank; a metallic cup-shaped housing receiving the outer end of said shank axially therethrough; a nut on said bolt; a glass cap overlying said nut and shank end and forming a closure for said housing, said cap being axially recessed to receive said nut and having a peripheral groove thereon; and means in said housing for irremovably retaining said cap, said means including spring fingers receivable in said groove, whereby said cap has a portion annularly received between said nut and said fingers.

JOHN F. BERGANDER.